United States Patent [19]

Ortloff

[11] 4,225,160
[45] Sep. 30, 1980

[54] LOW FRICTION REMOTELY OPERABLE CLAMP TYPE PIPE CONNECTOR

[75] Inventor: John E. Ortloff, Houston, Tex.

[73] Assignee: Exxon Production Research Company, Houston, Tex.

[21] Appl. No.: 881,293

[22] Filed: Feb. 27, 1978

[51] Int. Cl.³ .................... F16L 23/00; F16L 39/00
[52] U.S. Cl. .......................... 285/137 A; 285/367; 285/408
[58] Field of Search ............... 285/367, 366, 365, 411, 285/410, 409, 408, 137 A, DIG. 18, 111 (U.S. only), 407

[56] References Cited

U.S. PATENT DOCUMENTS

| | | | |
|---|---|---|---|
| 1,605,507 | 11/1926 | Burke | 285/111 X |
| 1,756,094 | 4/1930 | McGuirk | 285/410 X |
| 1,825,774 | 10/1931 | Boynton | 285/DIG. 18 X |
| 1,916,598 | 7/1933 | Ayres et al. | 285/DIG. 18 |
| 3,042,430 | 7/1962 | Guy | 285/365 |
| 3,231,297 | 1/1966 | Watts et al. | 285/366 X |
| 3,354,951 | 11/1967 | Savage et al. | 285/137 A X |
| 3,398,978 | 8/1968 | Gasche | 285/367 X |
| 3,637,223 | 1/1972 | Weber | 277/205 |
| 3,661,409 | 5/1972 | Brown et al. | 285/367 X |
| 3,997,198 | 12/1976 | Linder | 285/111 X |
| 4,121,858 | 10/1978 | Schulz | 285/DIG. 8 X |

FOREIGN PATENT DOCUMENTS 1196266 5/1959 France ................................... 285/367

Primary Examiner—Thomas F. Callaghan
Attorney, Agent, or Firm—Robert B. Martin

[57] ABSTRACT

A clamp type connector for securing the ends of conduits having mating end flanges providing a fluid pressure tight connection, the connector comprising a plurality of clamp segments pivotally secured to each other in end-to-end relationship and having arcuate grooves of wedge-shaped cross-section. The conduit flanges are wedge-shaped in cross-section and adapted to be compressed tightly by the grooves of said clamp segments. The clamp segments are actuated by a double acting screw which is operable to clamp or unclamp the connection. The arcuate grooves in the clamp segments are provided with antifriction bearings, e.g. ball bearings, roller bearings or bushings, and the segments are provided with external stops limiting the movement of the individual segments in clamps having four or more segments. This clamp type connector is secured on one of the conduits and is removed or installed with such conduit. The double acting screw is capable of remote operation to permit the clamp to be installed or removed from deep water oil and gas production riser systems. The clamp is useful for securing together the ends of ordinary conduits and of special conduit components such as rotary swivels, slip joints and the like.

22 Claims, 16 Drawing Figures

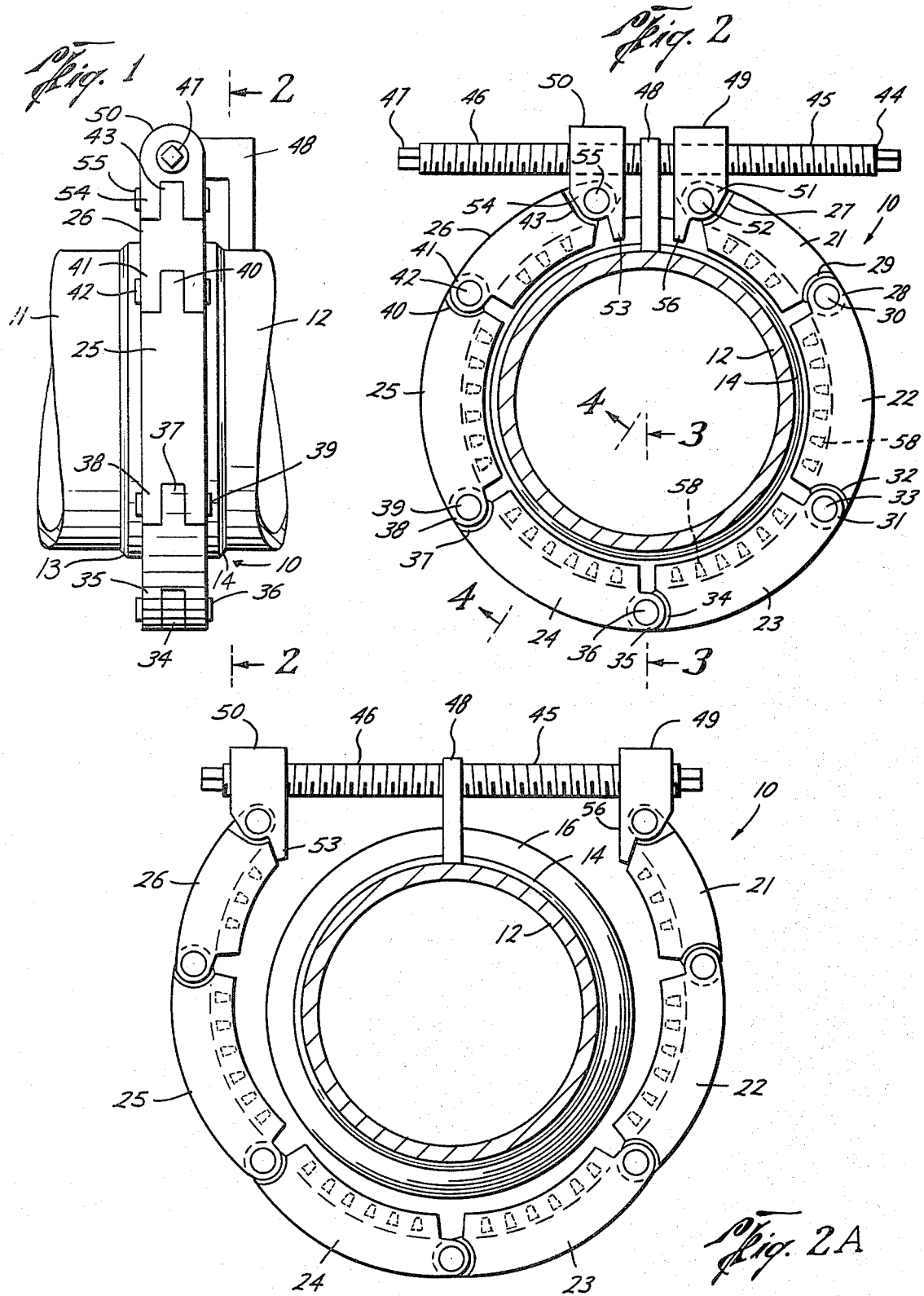

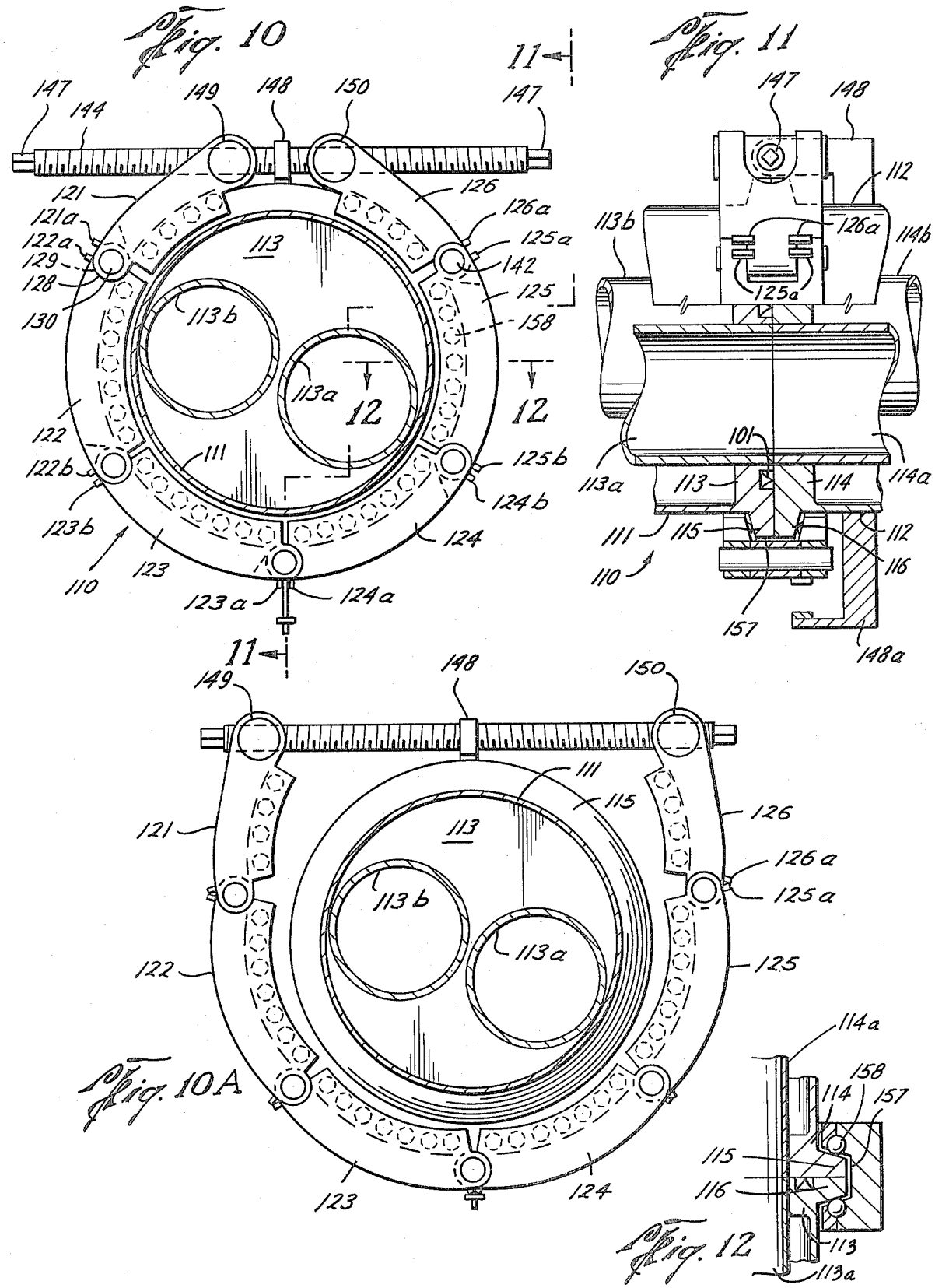

4,225,160

LOW FRICTION REMOTELY OPERABLE CLAMP TYPE PIPE CONNECTOR

BACKGROUND OF THE INVENTION

1. Field of the Invention

This invention relates to new and useful improvements in clamp type conduit connectors and particularly to large diameter segmented clamp connectors that are remotely operable and that are designed to clamp flanged conduits together in a fluid tight joint. Conduit connectors of this type are particularly useful for removable attachment of components in riser systems for production of crude oil and gas from undersea wells.

2. Description of the Prior Art

In the production of crude oil and gas from undersea wells it has been necessary to develop improved multiline production riser systems that will accommodate a variety of motions resulting from wave action, currents, vessel motion and the like. The development of a satisfactory production riser system for undersea production of crude oil and gas has necessitated the development of suitable multiline universal joints that permit simultaneous flexing of the flowlines in the riser system. In production riser system design it has been necessary to use large diameter connectors to attach multiple rotary swivels, aligned on a common axis, to multiple parallel conduits in the multiline universal joints to achieve the required flowline flexibility. These swivels and slip joints frequently require underwater maintenance at great depths and it is sometimes necessary to replace them in water as deep as 2,000-3,000 feet. It is, therefore, necessary to have remotely operable connectors that can be opened and closed for removal and replacement of the swivel assemblies.

One remotely operable connector, which is available commercially, is the Grayloc remote operating clamp type connector manufactured by the Gray Tool Company, Houston, Tex. This connector has been used for a variety of conduit connections but is not suitable, as presently manufactured, for remote installation or removal in underwater applications of the type discussed above.

Watts and Hill U.S. Pat. Nos. 2,766,829; 2,766,998; and 2,766,999 disclose a coupling including two parts to be assembled together in sealed relation, each of said parts having sealing end flanges, a sealing ring positioned between the parts and a clamping flange positioned around the flanges.

Watts U.S. Pat. No. 3,716,746 discloses another type of sealing ring for sealing flanged couplings in end-to-end relation, the flanges of which are secured together by a peripheral clamping ring.

Watts and Hill U.S. Pat. No. 3,231,297 discloses still another pipe joint clamp in which a sealing ring is positioned between the flanges that are to be joined and clamped by a peripheral clamping ring. The clamping ring includes a plurality of arcuate segments that clamp around the periphery of the coupling flange.

Latham et al, U.S. Pat. No. 3,325,176 discloses still another sealing ring and flange clamp for high pressure couplings.

Quebe et al, U.S. Pat. No. 3,400,950 discloses still another sealing ring and flange clamping ring.

Hill et al, U.S. Pat. No. 3,467,120 discloses a clamping ring for securing a burst disc in position between the flanged ends of couplings.

Crain, U.S. Pat. No. 3,484,912 discloses a segmented clamping ring for clamping flanged pipes or couplings together and provided with a remotely removable hinge.

Bridges et al, U.S. Pat. No. 3,625,282 discloses an annular clamping ring for securing a blowout preventer in position on a petroleum wellhead production conduit.

The Grayloc connector mentioned above and the connectors mentioned in the various listed patents are satisfactory for certain applications. However, these connectors do not provide for connection of a plurality of conduits together using hubs having two or more bores and do not provide for high pressure joining of the conduit flanges and further do not include design features permitting the use of a highly articulated clamping flange which can be fully opened around the conduit flanges and again clamped in position by remote operation.

SUMMARY OF THE INVENTION

The clamp type connector, for securing the ends of conduits (or conduit components) having mating end flanges providing a fluid pressure tight connection, comprises a plurality of clamp segments pivotally secured to each other in end-to-end relation and having arcuate grooves of wedge-shaped cross-section shaped to fit the conduit flanges. The clamp segments, when tightened, compress the conduit flanges in a mating relation by wedging action of the grooves on the flanges. The arcuate grooves include bearings such as ball bearings, roller bearings or bushings positioned in the grooves to reduce the energy required to overcome friction between the grooves and the wedge-shaped surfaces of the conduit flanges during tightening or makeup and to increase the energy available for clamping the flanges. The clamp is preferably operated by a double acting screw connected to the free ends of two of the clamp segments and operable upon rotation in opposite directions to move said segments to clamp or unclamp the connector. In the case of clamps having four or more segments, the clamp segments are provided with stops that limit the rotation of the segments during opening operation to insure that the segments will open away from the flanges being clamped.

BRIEF DESCRIPTION OF THE DRAWINGS

FIG. 1 is a view in side elevation of one embodiment of the segmented clamp for flanged conduits or conduit components.

FIG. 2 is a view in end elevation of the conduit clamp or connector viewed on the line 2—2 of FIG. 1.

FIG. 2A is a view of the clamp or connector as seen in FIG. 2 with the actuating thread turned to a position where the clamp segments are fully opened.

FIG. 10 is an end view, similar to FIGS. 2 and 7, of still another embodiment of the segmented clamp, this embodiment having external stops for limiting movement of clamp segments during opening of the clamp and further providing for the securing of two or more conduits.

FIG. 10A is a view in end elevation as seen in FIG. 10 with the actuating screw moved to open the segmented clamp to a fully opened position.

FIG. 11 is a partial sectional view taken on the line 11—11 of FIG. 10.

FIG. 12 is a fragmentary sectional view taken on the line 12—12 of FIG. 10.

DESCRIPTION OF THE PREFERRED EMBODIMENTS

Figure 3:
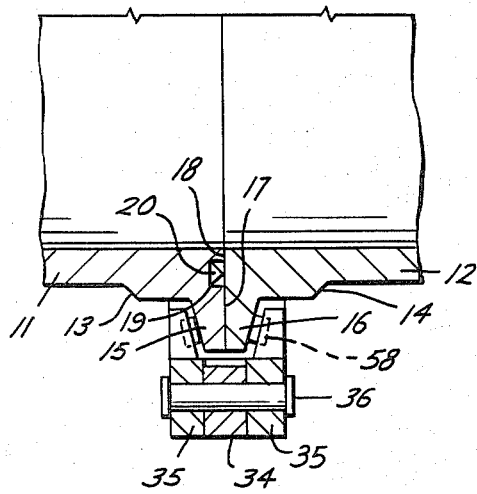
FIG. 3 is a detailed section view on the line 3—3 of FIG. 2 illustrating the hinge pin for the clamp segments and the engagement of the clamp segments with the tapered flanges and the high pressure seal provided for the flanged connection.

One of the major critical components required in production riser systems for production of crude oil and gas from subsea wells or distribution manifolds is a remotely operable connector for connecting conduits and conduit components such as rotary swivels and extensible slip joints. In particular, there is a great need for remotely operable connectors for attaching modular swivels, aligned on a common axis, to the piping and universal joints which function to accommodate the flexing motions as the riser moves in response to wave action, currents, vessel motion, etc. Several embodiments of remotely operable clamp type connectors are illustrated in the drawings.

In FIG. 1 there is shown a connector or clamping ring 10 for securing together two conduits or conduit components 11 and 12. It should be noted that the term "conduit" as used herein is intended to include hubs for connecting together conduits or conduit components such as rotary swivels, extensible slip joints and the like. It is necessary to examine FIGS. 1-6, inclusive, to have a complete understanding of this embodiment of the remotely operable connector.

Conduit 12, in FIG. 1, may be the rotating tubular sleeve or shaft of a rotary swivel or may be any conduit requiring this type of connector. Conduits 11 and 12 terminate in hub portions 13 and 14 which have flanges 15 and 16, respectively, having conical surfaces, as shown in FIG. 3. The mating surfaces 17 and 18 of hubs 13 and 14 are preferably smooth and are held in a fluid tight joint by the connector 10. Hub 13 is provided with an annular groove 19 in its end face 18 in which there is positioned an annular metal seal 20 of V-shaped cross-section. The V-seal 20 is used to provide a fluid-tight joint and surrounds the opening in the hub. In the case where there is only one opening and in the case where there are several openings in a hub for securing a plurality of conduits a V-seal is used around each opening to provide a fluid-tight seal. The mating surfaces 17 and 18 of hubs 13 and 14 are held tightly together by wedging forces applied against the wedge-shaped mating flanges 15 and 16 by a connector 10 as will be subsequently described.

Referring now to FIG. 2, it is seen that connector 10 is articulated or segmented and is comprised of six segments 21, 22, 23, 24, 25, and 26. The segments 21-26 of connector 10 are connected to each other in end-to-end relation by a hinge connection in the form of a tongue fitting into a fork with the hinge pin positioned therethrough.

Clamp segment 21 has a tongue portion 27 at one end and a tongue portion 29 at the other end. Forked portion 28 of adjacent clamp segment 22 receives tongue portion 29 of clamp segment 21 and the hinge is completed by hinge pin 30 extending through the fork 28 and tongue 29. Clamp segment 22 has a tongue portion 32 at the opposite end which engages forked portion 31 of clamp segment 23 and the hinge connection is completed by hinge pin 33 positioned through fork 31 and tongue 32. At the other end of clamp segment 23 is tongue portion 34 which engages forked portion 35 of clamp segment 24 and the hinge is completed by hinge pin 36 extending through tongue 34 and fork 35. At the other end of clamp segment 24 is tongue portion 37 which engages forked portion 38 of clamp segment 25 and the hinge is completed by hinge pin 39 extending through tongue 37 and fork 38. At the other end of clamp segment 25 is tongue portion 40 which engages fork portion 41 of clamp segment 26 and the hinge is completed by hinge pin 42 extending through tongue 40 and fork 41. At the other end of clamp segment 26 is tongue portion 43.

One of the hinge joints is shown in cross-section in FIG. 3. In that view, the connection of the tongue 34, fork 35, and hinge pin 36 is shown.

At the upper end of connector 10, there is provided a double acting screw 44 having right hand threads 45 at one end and left hand threads 46 at the other end. Screw 44 has a square drive end 47 arranged to rotate the screw for actuation of the connector 10. Screw 44 is supported in the middle by bracket 48 which is secured on conduit 12 so that screw 44 and the entire connector 10 are supported on conduit 12 for removal therewith. A pair of nuts 49 and 50 are supported on screw 44 with nut 49 being actuated by right hand threads 45 and nut 50 actuated by left hand threads 46. The lower end of nut 49 has a fork 51 which receives tongue 27 of clamp segment 21. The hinge pin 52 extends through fork 51 and tongue 27 to complete a hinged connection. The lower end of fork 51 on nut 49 constitutes a pair of stops 56 which are engageable with the upper end of clamp segment 21 to limit movement thereof. Nut 50 is positioned on and actuated by left hand threads 46 and has a fork portion 54 at its lower end which receives tongue 43 of clamp segment 26. A hinge pin 55 extends through fork 54 and tongue 43 to provide a hinged connection. The lower end of fork 54 terminates in a pair of stops 53 which are engageable with the end of clamp segment 26 to limit movement thereof.

In operation, conduits 11 and 12 are assembled with hubs 13 and 14 in mating relation at surfaces 17 and 18.

Figure 4:
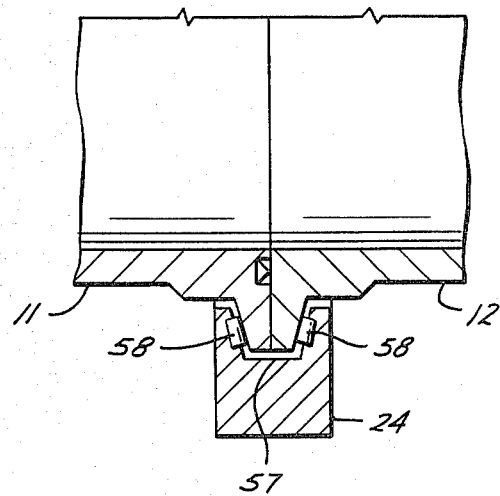
FIG. 4 is a sectional view taken on line 4—4 of FIG. 2 showing a clamp segment in position against the conduit flanges and showing the bearings provided in the clamping groove.
Figure 5:
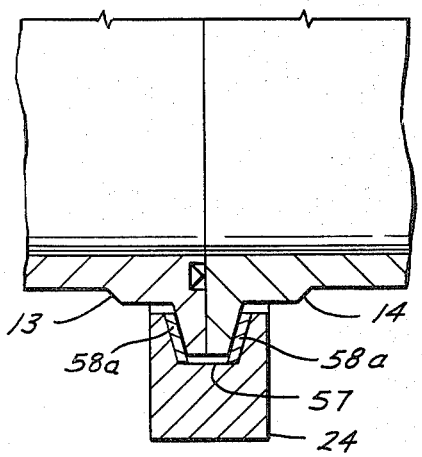
FIG. 5 is a sectional view similar to FIG. 4 illustrating the substitution of a pressed bushing as the bearing in the groove of the clamp segments.
Figure 6:
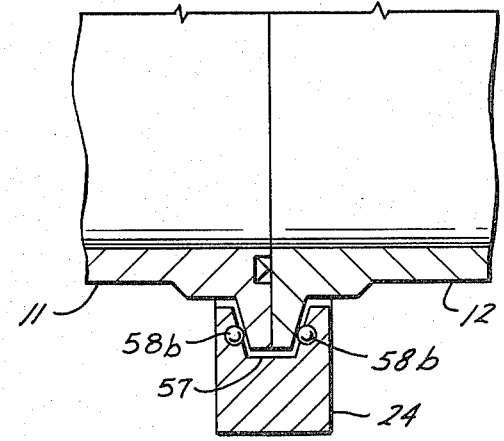
FIG. 6 is a view similar to FIG. 4 showing the substitution of ball bearings as the bearings in the clamping grooves of the clamp segments.

Flanges 15 and 16 providing conical surfaces meet and form a wedge shape which is held tightly together by connector 10. V-seal 20 presses into the surface 18 of hub 14 and provides a fluid pressure tight seal. Clamp segments 21-26 are assembled around the periphery of mating flanges 15 and 16 and are engageable with the flanges as seen in FIGS. 3 and 4. It is necessary to subject the mating surfaces 17 and 18 and seal 20 to very high preloads to insure a completely fluid-tight joint and prevent high pressure in the conduits from separting the faces of the hubs. Because the clamping action must exert a very high pressure on the mating surfaces 17 and 18, it is necessary to minimize the friction during the clamping action. The interior of clamp segments 21-26 are provided with arcuate grooves 57 which are wedge-shaped in cross-section to provide a wedging action against flanges 15 and 16. The interior of grooves 57 is provided with antifriction bearings which in the embodiment shown in FIG. 4 are roller bearings 58. Roller bearings 58 are positioned uniformly around the arcuate grooves of the clamp segments 21-26 at closely spaced intervals to reduced friction between the interior of the clamp segments and the corresponding conical surfaces of flanges 15 and 16. In FIG. 5, there is shown an alternate bearing arrangement for grooves 57. In this embodiment, grooves 57 are provided with bushings 58a of suitable bearing metal which provide a smooth continuous low friction bearing surface. In FIG. 6, ball bearings 58b are substituted for roller bearings 58 as shown in FIG. 4.

When screw 44 is rotated in one direction by actuation of any suitable rotating member with square drive 47, nuts 49 and 50 are drawn together to cause clamp segments 21-26 to be pulled tightly around wedge-shaped flanges 15 and 16 to press hubs 13 and 14 into a fluid-tight relation. Screw 44 may be turned until nuts 49 and 50 have been tightened to the point that arcuate grooves 57 acting on flanges 15 and 16 through bearings 58 (or 58a or 58b) cause the completely fluid-tight joint to be made.

When screw 44 is rotated in the opposite direction, nuts 49 and 50 are moved outward away from supporting member 48. As nuts 49 and 50 move outwardly, clamp segments 21 and 26 begin to rotate away from engagement with flanges 15 and 16. After a small amount of movement, the stops 56 and 53 engage the ends of clamp segments 21 and 26, respectively, and force those members to move clamp members 22 and 25 outward and away from engagement with flanges 15 and 16. By the time that nuts 49 and 50 have been moved to their outermost position on screw 44, all of the clamp segments 21-26 have been moved away from engagement with flanges 15 and 16 and the connector assumes the position shown in FIG. 2A. When the rotation of the screw is again reversed, the clamp segments are moved in an articulated manner around the periphery of the flanges 15 and 16 by movement of nuts 49 and 50 and the connector is again restored to a clamping position.

The clamp connector as just described, is capable of remote operation, particularly in deep water installations. The screw can be operated by a deep water maintenance vehicle using a manipulator arm to perform the desired functions. The connector is supported on one of the conduits 12 (which may be part of the swivel or slip joint and which may be removed or installed integrally therewith). The connector, as described, provides for a substantial reduction in friction by using bearings 58 (or 58a or 58b) on clamping flanges 15 and 16. The arrangement of the stops on nuts 49 and 50 facilitates and controls the opening of the connector by sequential movement of clamp segments 21-26.

AN ALTERNATE EMBODIMENT

Figure 7:
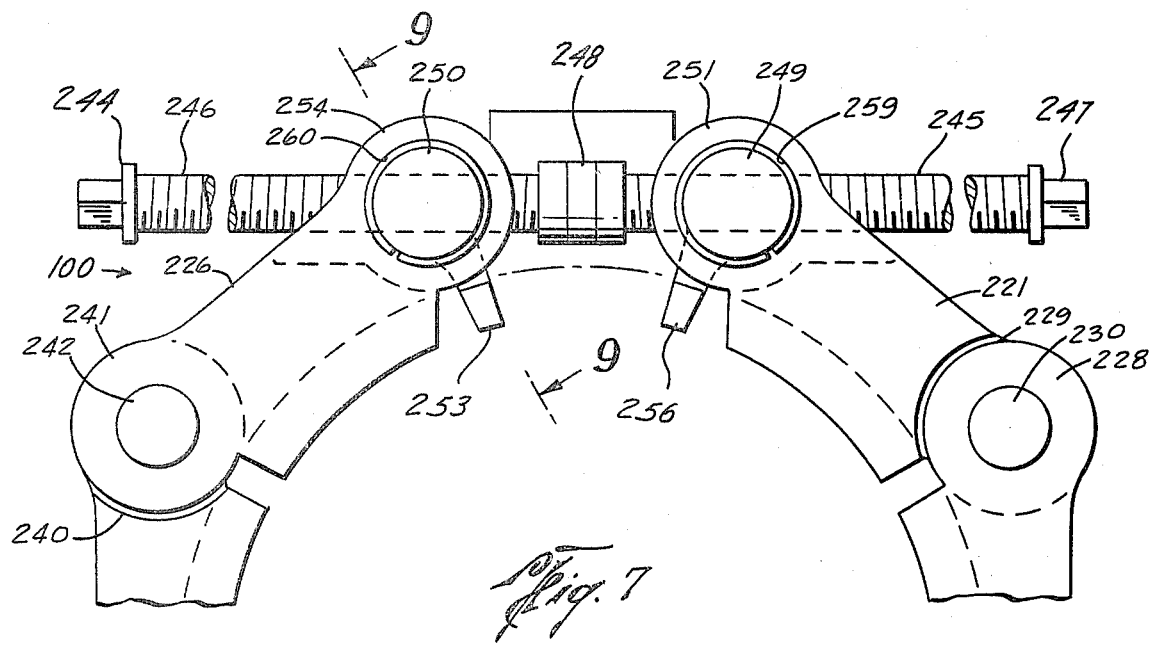
FIG. 7 is a fragmentary end view, similar to the view shown in FIG. 2, of another embodiment of the conduit clamp in which the actuating screw extends through swivel nuts in the free ends of the articulated clamp.
Figure 8:
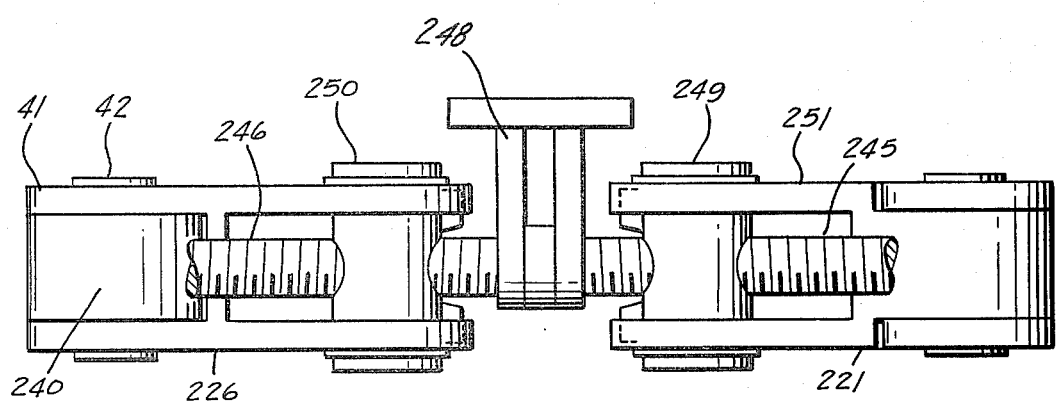
FIG. 8 is a top view of the embodiment of the clamp shown in FIG. 7.
Figure 9:
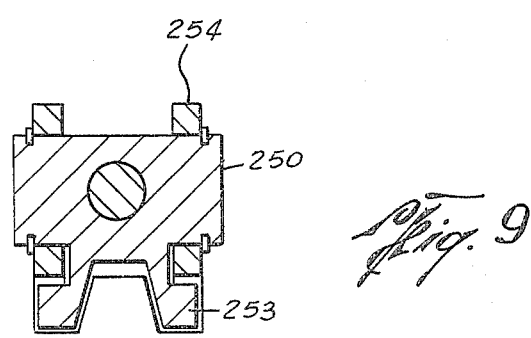
FIG. 9 is a sectional view taken on the line 9—9 of FIG. 7 illustrating the stops that limit movement of the adjacent clamp segments during opening operation.

In FIGS. 7, 8, and 9 there is shown an alternate embodiment of the segmented clamp connector for flanged conduits shown in FIGS. 1-6. Since the changes in construction are primarily in the actuating portion of the clamp mechanism, only the uppermost clamp segments and the clamp actuating screw are shown.

The embodiment shown in FIGS. 7-9 is the same as that shown in FIGS. 1-6 except that the actuating screw is arranged to operate through swivel nuts to prevent the application of a high bending action on the screw during the tightening of the clamp. In FIG. 7, it is seen that screw 244 has right hand threads 245 at one side and left hand threads 246 at the other side and is arranged for operation by square drive 247. Screw 244 is supported centrally by bracket 248, which is secured on conduit 12 (not shown). This embodiment differs, however, in that nuts 249 and 250 are substituted for nuts 49 and 50 of FIG. 2. Nuts 249 and 250 are swivel nuts which are supported in apertures 259 and 260, respectively, in forked end portions 251 and 254 of clamp segments 221 and 226, respectively. Swivel nuts 249 and 250 are provided with stops 256 and 253 which are engageable with the ends of clamps 221 and 226. FIG. 9 shows a detailed sectional view of swivel nut 250 supported in forked end portion 254 and shows the construction of stop 253.

This embodiment of connector 100 functions the same as the embodiment shown in FIGS. 1-6. The bearings used in the arcuate grooves of the clamp segments may be roller bearings or ball bearings or a friction bushing as shown in FIGS. 4, 5, and 6. The rotation of screw 244 in opposite directions by square drive 247 causes movement of nuts 249 and 250 in the same manner as nuts 49 and 50 are moved in the apparatus illustrated in FIG. 2. In this embodiment, however, nuts 249 and 250 swivel as they are moved on screw 244. The nuts swivel in the ends of clamp segments 221 and 226 with the result that there is no tendency to place a high bending moment on screw 244. The stops 253 and 256 function the same as stops 53 and 56 in the embodiment of FIG. 2 and cause the clamp segments to open sequentially in the manner described in connection with the operation of the embodiments of FIGS. 1-6.

ANOTHER EMBODIMENT

In FIGS. 10-12, inclusive, there is shown a still further embodiment of the segmented clamp connector previously described. In this embodiment, the clamp segments are provided with external stops limiting the movement of individual segments and the clamping hub is arranged for securing a plurality of conduits in the connection.

In FIGS. 10-12, there are shown tubular members 111 and 112 which terminate in hubs 113 and 114 having clamping flanges 115 and 116. Hubs 113 and 114 have openings receiving conduits for connection to swivel or slip joints or the like. Hubs 113 and 114 are shown receiving conduits 113a and 113b and conduits 114a and 114b which are fixed in the hubs by welding or other means in fluid tight relationship. The hubs 113 and 114 are sealed in a fluid-tight face-to-face relationship by V-metal seals 101 when they are secured together by connector 110. The structure of the hubs, other than providing for support of a plurality of conduits, is the same as in the previously described embodiments of the invention.

Hubs 113 and 114 and their flanges 115 and 116 are secured together by connector 110 which is constructed to a plurality of clamp segments substantially as in the embodiments of FIGS. 7 and 8. Clamp segments 121, 122, 123, 124, 125, and 126 are provided with hinges substantially the same as those shown in the other embodiments. The hinge between clamp segments 121 and 122 consists of tongue 129 fitted in fork 128 and secured in place by hinge pin 130. The construction of the other hinges is the same. The various clamp segments are each provided with stops positioned on the exterior of the respective hinges and limit outward rotation of the clamp segments. Thus, end clamp segment 121 is provided with stops 121a which are engageable with stops 122a on internal clamp segment 122. Internal clamp segment 122 is also provided with stops 122b which are engageable with stops 123b on internal clamp segment 123. Internal clamp segment 123 has stops 123a engageable with stops 124a on internal clamp segment 124. Stops 124b on internal clamp segment 124 are engageable with stops 125b on internal clamp segment 125. Stops 125a are engageable with stops 126a on end clamp segment 126. The upper ends of end clamp segments 121 and 126 are provided with swivel nuts 149 and 150 which are supported on screw 144 which tangentially interconnects the outer ends of end segments 121 and 126. Screw 144 is provided with square drive heads 147 which may be actuated from either side. Screw 144 is supported on mounting bracket 148 which is supported on tubular member 112. Bracket 148a is also supported on tubular member 112 and limits downward movement of connector 110 during the opening of the connector.

The individual segments of the connector are provided with the plurality of ball bearings 158 positioned uniformly in the arcuate grooves 157. Roller bearings or pressed bushings could also be used as in the embodiments previously illustrated.

When screw 144 is rotated to move swivel nuts 149 and 150 to the position indicated in FIG. 10, the various clamp segments are tightened around the wedge-shaped flanges 115 and 116 to draw the same together. The wedge-shaped arcuate grooves 157 in the clamp segments bear against the wedge-shaped flanges to press the faces of the flanges and of the hubs into fluid-tight joints. Ball bearings 158 (or other suitable bearings) provide for a substantial reduction in friction during the tightening of the segmented clamp type connector. This results in a substantially greater amount of force being applied to tightening the joint and a lesser amount being applied to the overcoming of friction between the clamping wedge surfaces.

When screw 144 is rotated in the opposite direction, swivel nuts 149 and 150 are moved outward to the limit of movement on the screw 144. As swivel nuts 149 and 150 move outward, clamp segments 121 and 126 first begin to move outwardly from engagement with the flanges 115 and 116 while rotating around hinge pins 130 and 142 respectively. This outward rotation is limited by engagement of stops 121a and 122a and stops 126a and 125a. When these stops have engaged, the next clamp segments are forced outwardly until the stops which they carry engage the next clamp segments and so on. The external stops limit the ability of the clamp segments to pivot outwardly and cause the clamp segments to move away from the flanges 115 and 116 to release hubs 113 and 114. The extreme open position of this embodiment is shown in FIG. 10A.

ANOTHER EMBODIMENT

Figure 13:
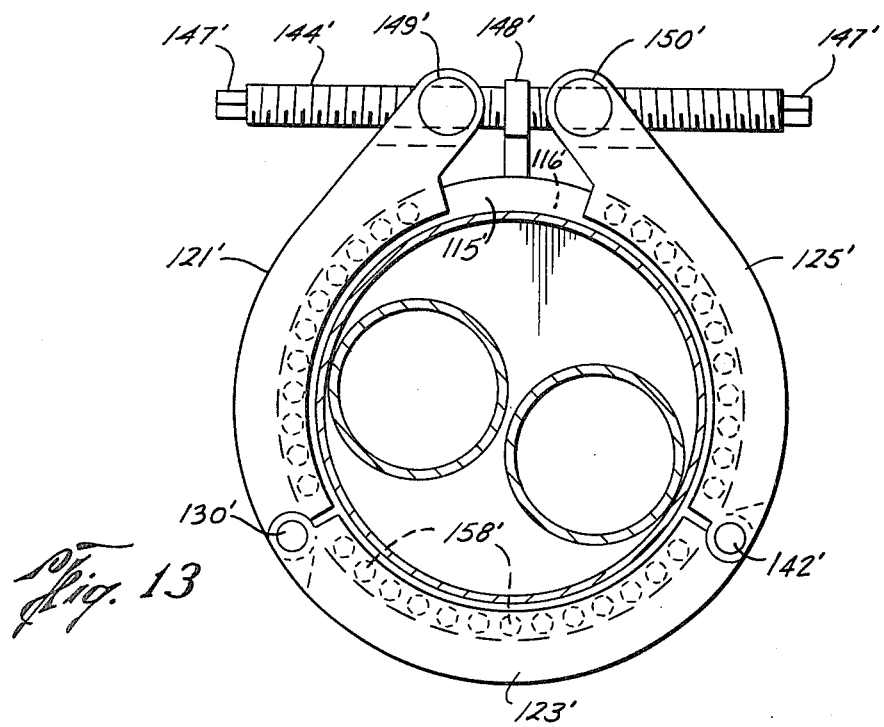
FIG. 13 is an end view of another embodiment of the segmented clamp substantially as shown in FIG. 10 but having three segments instead of six segments.
Figure 13A:
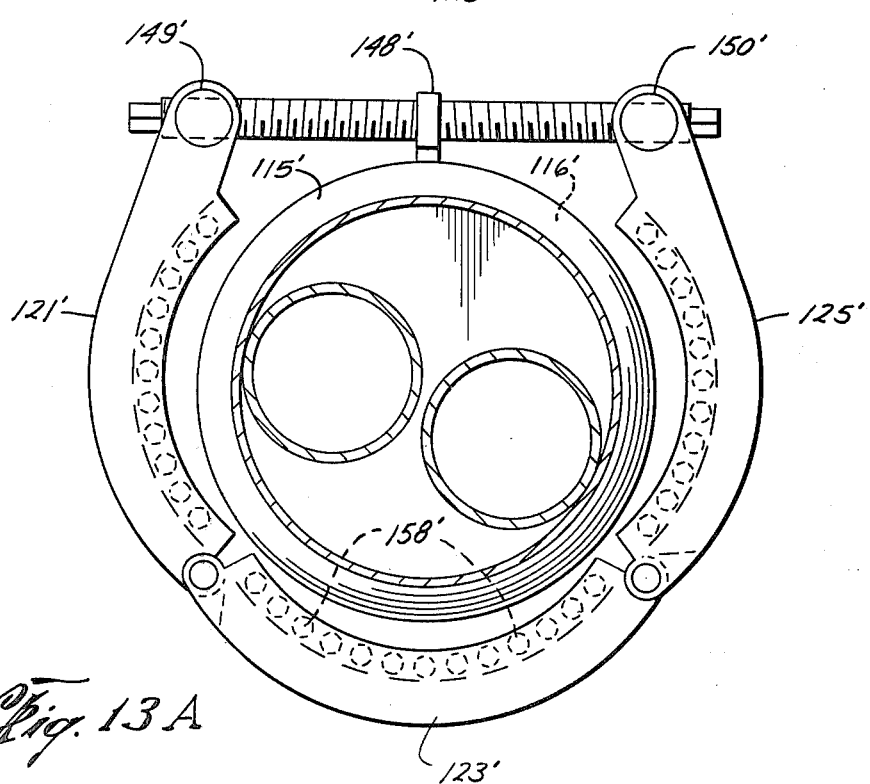
FIG. 13A is an end view of the clamp shown in FIG. 13 in a fully opened position.

In FIGS. 13 and 13A there is shown a further embodiment of the segmented clamp in which only three segments are required.

In this embodiment, the arrangement shown is substantially identical to that of FIG. 10. Clamp segments 121 and 122 of FIG. 10 are combined in this embodiment into a single clamp segment 121'. Similarly, clamp segments 123 and 124 of FIG. 10 are combined into a single clamp segment 123' in this embodiment. Likewise clamp segments 125 and 126 of FIG. 10 are combined into a single clamp segment 125' of this embodiment. The construction of the hinge is identical to that shown in FIG. 10 and the stops on the outside of the hinge connections have been eliminated. In this embodiment, the bearings used in the arcuate grooves in the clamp segments are shown as ball bearings of the type previously illustrated in FIG. 6. Roller bearings or bushings could also be used.

In this embodiment of the invention, the operation is identical to that previously shown insofar as the rotation of screw 144 and movement of swivel nuts 149 and 150 are concerned. This embodiment differs somewhat, however, in that the external stops are not needed in a segmented clamp type connector having only three clamping segments. Where only three clamping segments are used, the relationship between the clamp segments is more rigid and outward movement and rotation of segments 121' and 125' about hinge pints 130' and 142' respectively, will force segment 123' downwardly and away from the hub flanges 115' and 116' without the need for external stops as in FIG. 10 or internal stops as in FIGS. 2, 7, and 9. When fully opened, the segments are in the position shown in FIG. 13A.

In the foregoing specification, there have been illustrated several preferred embodiments of the invention. The use of bearings in the wedge-shaped arcuate grooves in the clamping segments is applicable to segmented clamps having two or more clamp segments. The use of external stops between the clamp segments as in FIGS. 10 and 11 or internal stops as in FIGS. 2, 7, and 9, is applicable to segmented clamps having four or more clamp segments. When only two or three clamp segments are used, the system is more rigid. When four or more clamp segments are used, the system becomes more flexible at the hinges and it is necessary to use the external or internal stops at the hinges to cause the clamp segments to open sequentially and to clear the clamping flanges to permit separation of the joint. The system illustrated in FIGS. 1-12 uses six clamp segments. This multisegmented clamp type connector can use any number of segments and as the number of segments is increased, there is a more uniform application of clamping forces around the periphery of the flange being clamped.

It should, therefore, be understood that the various embodiments shown are illustrative only of the inventive concept and that these embodiments should not be considered as limitations on the invention. The invention should be considered only as set forth in the appended claims.

What is claimed is:

1. In a clamp-type conduit connector for securing the ends of conduits having mating end flanges providing a fluid pressure tight connection, said flanges having a wedge-shaped cross-section, said connector including a plurality of clamp segments pivotally secured to each other and having arcuate grooves of wedge-shaped cross-section shaped to fit said conduit flanges in a mating position and adapted when circumferentially tightened to compress said flanges together by wedging action of said segments there-against, the improvement wherein said segments include bearings positioned therein to reduce the friction between the interior of said segments and the wedge-shaped surfaces of said flanges during circumferential tightening of the clamp segments.

2. A clamp-type conduit connector according to claim 1 in which said bearings are ball bearings.

3. A clamp-type conduit connector according to claim 1 in which said bearings are roller bearings.

4. A clamp-type conduit connector according to claim 1 in which said bearings are bushings.

5. A clamp-type conduit connector according to claim 1 including a threaded member operatively connected to the free ends of two of said segments and operable upon rotation in opposite directions to move said segments to a clamped or to an unclamped position.

6. A clamp-type conduit connector according to claim 5 in which said clamp comprises at least four clamp segments and said segments include means on the inside of the segments to limit the outward pivotal movement of the segments adjacent the threaded member as the threaded member is rotated to loosen said ring to thereby produce pivotal movement between at least two segments other than the segments adjacent the threaded member.

7. A clamp-type conduit connector according to claim 1 in which there are at least three clamp segments.

8. A clamp-type conduit connector according to claim 1 in which said clamp comprises at least four clamp segments, and said segments include stops limiting the pivotal movement of one segment relative to another.

9. A clamp-type conduit connector according to claim 1 in which said clamp comprises at least four clamp segments, and said segments include stops at the outside of each pivot point limiting the pivotal movement of one segment relative to another.

10. A clamp-type conduit connector according to claim 1 in which one of the mating surfaces of said flanges has an annular groove in its face, and an annular metal sealing ring of V-shaped cross-section positioned therein with a sharp edge engaging the other mating surface.

11. A clamp-type conduit connector according to claim 1 in which said connector is supported on one of said conduits in both open and closed positions.

12. A clamp-type conduit connector according to claim 1 in wich said connector is for a plurality of conduits, said plurality of conduits being surrounded by a single end flange and sealed therein and mating with a corresponding plurality of conduits secured in a single end flange mating with said first named end flange.

13. A clamp-type conduit connector according to claim 1 including a double acting screw operatively connected to the free ends of two said segments and operable upon rotation in opposite directions to move said segments to a clamped or to an unclamped position, and in which there are at least three clamp segments.

14. A clamp-type conduit connector according to claim 1 including a double acting screw operatively connected to the free ends of two of said segments and operable upon rotation in opposite directions to move said segments to a clamped position or to an unclamped position, and in which said clamp comprises at least four clamp segments and said segments include stops limiting the pivotal movement of one segment relative to another.

15. A clamp-type conduit connector according to claim 1 including a double acting screw operatively connected to the free ends of two of said segments and operable upon rotation in opposite directions to move said segments to a clamped position or to an unclamped position and in which said clamp comprises at least four clamped segments and said segments include stops at the outside of each pivot point limiting the pivotal movement of one segment relative to another.

16. A clamp-type connector according to claim 1 including a double acting screw operatively connected to the free ends of two of said segments and operable upon rotation in opposite directions to move said segments to a clamped position or to an unclamped position and in which said clamp comprises at least four clamped segments and said segments include stops at the inside of each pivot point limiting the pivotal movement of one segment relative to another.

17. A clamp-type conduit connector according to claim 1 including a double acting screw operatively connected to the free ends of two of said segments and operable upon rotation in opposite directions to move said segments to a clamped position or to an unclamped position and in which the mating surfaces of said flanges has an annular groove in its face and an annular metal sealing ring of V-shaped cross-section positioned therein with the sharp edge engaging the other mating surface.

18. A clamp-type conduit connector according to claim 1 including a double acting screw operatively connected to the free ends of two of said segments and operable upon rotation in opposite directions to move said segments to a clamped position or to an unclamped position and in which said connector is supported on one of said conduits in both open and closed positions.

19. A clamp-type connector according to claim 1 including a double acting screw operatively connected to the free ends of two of said segments and operable upon rotation in opposite directions to move said segments to a clamped position or to an unclamped position, said connector comprising at least three clamp segments, and in which said connector is supported on one of said conduits in both open and closed position.

20. A clamp-type conduit connector according to claim 1 including a double acting screw operatively connected to the free ends of two of said segments and operable upon rotation in opposite directions to move said segments to a clamped position or to an unclamped position, said connector comprising at least three clamp segments, said connector being supported on one of said conduits in both open and closed positions, one of the mating surfaces of said flanges having an annular groove in its face, and an annular metal sealing ring of V-shaped cross-section positioned therein with the sharp edge engaging the other mating surface.

21. A clamp-type conduit connector according to claim 1 including a double acting screw operatively connected to the free ends of two of said segments and operable upon rotation in opposite directions to move said segments to a clamped position or to an unclamped position, said connector being supported on one of said conduits in both open and closed positions, said connector comprising at least three clamp segments, and said connector being for a plurality of conduits, said plurality of conduits being surrounded by a single end flange and sealed therein and mating with a corresponding plurality of conduits secured in a single end flange mating with said first named end flange.

22. A clamp-type connector for securing the ends of conduits having mating end flanges providing conical surfaces which comprises: a clamping ring comprising two end clamping segments and at least two internal clamping segments, said segments being pivotally interconnected in end-to-end relationship, said segments having an internal arcuate groove of wedge-shaped cross section shaped to fit said conical surfaces of said flanges; bearings mounted on each segment and positioned to reduce the friction between said conical surfaces and the interior of said segments; a threaded member tangentially interconnecting the outer ends of said end segments, rotation of said threaded member in one direction being operative to tighten said ring on said conical surfaces and rotation in the opposite direction being operative to loosen said ring; means on said ring to limit the outward pivotal movement of the end segments as said threaded member is rotated to loosen said ring to thereby produce pivotal movement between at least two internal segments.

* * * * *